(12) United States Patent
Gysling et al.

(10) Patent No.: US 10,775,269 B2
(45) Date of Patent: Sep. 15, 2020

(54) BLADE HEALTH INSPECTION USING AN EXCITATION ACTUATOR AND VIBRATION SENSOR

(71) Applicant: UNITED TECHNOLOGIES CORPORATION, Farmington, CT (US)

(72) Inventors: Daniel L. Gysling, South Glastonbury, CT (US); Gregory S. Hagen, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 152 days.

(21) Appl. No.: 15/427,989

(22) Filed: Feb. 8, 2017

(65) Prior Publication Data

US 2018/0224353 A1 Aug. 9, 2018

(51) Int. Cl.
*G01M 15/14* (2006.01)
*F04D 27/00* (2006.01)
(Continued)

(52) U.S. Cl.
CPC .............. *G01M 15/14* (2013.01); *F02K 3/06* (2013.01); *F04D 27/001* (2013.01); *F04D 29/38* (2013.01); *F04D 29/661* (2013.01); *G01M 5/0016* (2013.01); *G01M 5/0033* (2013.01); *G01M 5/0041* (2013.01); *G01M 5/0066* (2013.01); *G01M 5/0083* (2013.01); *G01M 5/0091* (2013.01); *F05D 2260/80* (2013.01); *F05D 2260/83* (2013.01); *F05D 2260/962* (2013.01);
(Continued)

(58) Field of Classification Search
CPC ....... F01D 21/003; F01D 17/02; G01H 1/006; G01M 15/14; F05D 2260/80; F04D 2270/334; G01N 3/36; G01N 2203/0042
USPC ....................... 73/660, 671; 702/56; 701/100
See application file for complete search history.

(56) References Cited

U.S. PATENT DOCUMENTS 2,693,696 A * 11/1954 Koehler ................. G01H 13/00
73/671
3,555,892 A * 1/1971 Hizume .................. G01M 7/00
73/671
(Continued)

FOREIGN PATENT DOCUMENTS

DE 102006048791 A1 * 4/2008 .......... G01M 13/028
EP 899427 A2 * 3/1999
(Continued)

OTHER PUBLICATIONS

Rossi et al, Design of blade tip timing measurement systems based on uncertainty analysis, 2012, Proceedings of the International Instrumentation Symposium.*
(Continued)

*Primary Examiner* — David L Singer
(74) *Attorney, Agent, or Firm* — Snell & Wilmer, L.L.P.

(57) ABSTRACT

A system and method for blade health inspection is provided. The system may include a health monitoring processor, an excitation actuator, and a health monitoring sensor. The excitation actuator may pulse a force against an engine blade to cause non-integral vibratory excitations in engine blades. The health monitoring sensor may measure the vibratory excitations. The health monitoring processor may analyze the vibratory excitations to determine the health of the engine blade.

15 Claims, 4 Drawing Sheets

(51) Int. Cl.
    *F04D 29/66* (2006.01)
    *F02K 3/06* (2006.01)
    *F04D 29/38* (2006.01)
    *G01M 5/00* (2006.01)

(52) U.S. Cl.
    CPC .. *F05D 2270/804* (2013.01); *F05D 2270/821* (2013.01)

(56) References Cited

U.S. PATENT DOCUMENTS

| | | | | |
|---|---|---|---|---|
| 3,651,688 | A * | 3/1972 | Hizume | G01M 7/00 73/671 |
| 4,389,891 | A * | 6/1983 | Fournier | G01H 13/00 73/579 |
| 4,776,216 | A * | 10/1988 | Barton | G01H 1/006 73/660 |
| 5,005,353 | A * | 4/1991 | Acton | F01D 17/02 415/119 |
| 5,148,735 | A * | 9/1992 | Veletovac | F15B 13/043 137/625.64 |
| 5,484,104 | A * | 1/1996 | Kukler | F02M 49/02 239/87 |
| 6,195,982 | B1 * | 3/2001 | Gysling | F04D 29/668 415/119 |
| H002057 | H * | 1/2003 | Veers | 416/230 |
| 7,023,205 | B1 * | 4/2006 | Krupp | G01N 27/72 324/239 |
| 8,000,930 | B2 * | 8/2011 | Poncet | G05B 23/0229 702/181 |
| 9,347,466 | B2 * | 5/2016 | Hoglund | F01L 9/02 |
| 2002/0059831 | A1 | 5/2002 | Naudet | |
| 2002/0083772 | A1 * | 7/2002 | Sonnichsen | G01H 1/006 73/660 |
| 2004/0089812 | A1 * | 5/2004 | Favro | G01N 3/60 250/341.6 |
| 2004/0243310 | A1 * | 12/2004 | Griffin | G01H 1/006 702/10 |
| 2005/0041898 | A1 * | 2/2005 | Yamada | F16C 35/061 384/490 |
| 2005/0278127 | A1 * | 12/2005 | Griffin | G01H 1/006 702/56 |
| 2007/0272018 | A1 * | 11/2007 | Shadman | G01H 1/006 73/579 |
| 2008/0177485 | A1 * | 7/2008 | Cohen | F01D 21/003 702/56 |
| 2008/0201104 | A1 * | 8/2008 | Poncet | G05B 23/0229 702/181 |
| 2008/0206057 | A1 * | 8/2008 | Twerdochlib | F01D 5/225 416/190 |
| 2009/0060704 | A1 * | 3/2009 | Hurwitz | B64D 33/02 415/1 |
| 2009/0078052 | A1 * | 3/2009 | Twerdochlib | G01H 1/003 73/660 |
| 2009/0084187 | A1 * | 4/2009 | Twerdochlib | G01H 1/003 73/660 |
| 2009/0107223 | A1 * | 4/2009 | Thomassin | G01M 15/12 73/112.05 |
| 2010/0003121 | A1 * | 1/2010 | Berryann | F02K 1/12 415/1 |
| 2010/0018316 | A1 * | 1/2010 | Nicklous | G01H 9/00 73/655 |
| 2010/0018321 | A1 * | 1/2010 | Nicklous | F01D 17/02 73/800 |
| 2010/0082273 | A1 * | 4/2010 | Lakomiak | G05B 23/0216 702/56 |
| 2010/0114502 | A1 * | 5/2010 | Badami | F03D 17/00 702/35 |
| 2013/0068024 | A1 * | 3/2013 | Xu | G01B 15/00 73/579 |
| 2013/0082833 | A1 * | 4/2013 | Bhattacharya | G01H 1/003 340/517 |
| 2013/0304418 | A1 * | 11/2013 | Gendrich | F01D 17/02 702/182 |
| 2013/0321824 | A1 * | 12/2013 | Hockaday | G01B 11/026 356/614 |
| 2014/0238009 | A1 * | 8/2014 | Hoglund | F01L 9/02 60/370 |
| 2014/0334916 | A1 * | 11/2014 | Snyder | F01D 25/285 415/118 |
| 2015/0184536 | A1 * | 7/2015 | Panicker | F01D 21/003 416/1 |
| 2015/0323186 | A1 * | 11/2015 | Xu | F02C 7/224 60/782 |
| 2015/0345325 | A1 * | 12/2015 | Khibnik | F01D 21/003 60/805 |
| 2015/0345403 | A1 * | 12/2015 | Cai | F02C 9/00 701/100 |
| 2016/0258440 | A1 * | 9/2016 | Henry | F04D 27/001 |

FOREIGN PATENT DOCUMENTS

| | | | | |
|---|---|---|---|---|
| FR | 2956206 | A1 * | 8/2011 | G01H 1/006 |
| JP | 62150133 | A * | 7/1987 | |
| JP | 08100604 | A * | 4/1996 | |

OTHER PUBLICATIONS

Srinivasan, Flutter and Resonant Vibration Characteristics of Engine Blades an IGTI Scholar Paper, Presented at the International Gas Turbine & Aerwngine Congress & Exhibition, Orlando, Florida—Jun. 2-5, 1997.*

Peters, Low FPR Propulsion Noise and Performance in Ultra-Short Nacelles, 2011.*

Pickering, Methods for Validation of a Turbomachinery Rotor Blade Tip Timing System, 2014.*

Watkins et al, Noninterference Blade-Vibration Measurement System for Gas Turbine Engines, J. Propulsion vol. 5, No. 6, Nov.-Dec. 1989.*

Machine Translation of FR 296206 (Year: 2019).*

Turevskiy, Thesis: Flutter Boundary Prediction Using Experimental Data, Massachusetts Institute of Technology (Year: 1998).*

Dimitriadis et al, Flutter Prediction from Flight Flutter Test Data, Journal of Aircraft vol. 38, No. 2, Mar.—Apr. 2001 (Year: 2001).*

European Patent Office, European Search Report dated Jul. 2, 2018 in Application No. 18155394.2-1001.

European Patent Office, European Search Report dated Oct. 8, 2018 in Application No. 18155394.2-1001.

* cited by examiner

BLADE HEALTH INSPECTION USING AN EXCITATION ACTUATOR AND VIBRATION SENSOR

FIELD

The present disclosure relates to gas turbine engines, and more specifically, to systems and methods for blade health monitoring in gas turbine engines.

BACKGROUND

Gas turbine engines typically include a fan section to drive inflowing air, a compressor section to pressurize inflowing air, a combustor section to burn a fuel in the presence of the pressurized air, and a turbine section to extract energy from the resulting combustion gases. The fan section may include a plurality of fan blades coupled to a fan hub. The compressor section and the turbine section typically include a series of alternating rotors and stators. A rotor generally comprises a rotor disk and a plurality of blades. Diagnostic systems may be used to monitor the health of fan blades and rotor blades. Typically, diagnostic systems use a time-of-arrival sensor to monitor blade health. Time-of-arrival sensors may be well-suited to measure non-integral engine vibrations but, because integral engine order vibrations appear as stationary patterns in the stationary frame, time of arrival sensors are typically not as well-suited to measure integral engine vibrations. Because the majority of engine blade excitations are due to integral engine vibrations, time-of-arrival sensors may be challenged to detect small cracks in engine blades and accurately measure blade health is the sensors are relying on characterizing integral engine order vibrations.

SUMMARY

In various embodiments, a system for blade health monitoring is disclosed. The system may comprise a health monitoring processor configured to transmit an excitation control signal. The system may comprise an excitation actuator configured to receive the excitation control signal and create a based on the excitation control signal, wherein the force is configured to excite a vibratory response in a fan blade. The system may also comprise a health monitoring sensor configured to measure the vibratory response of the fan blade, and generate a blade displacement data based on the measured vibratory response.

In various embodiments, the health monitoring processor may comprise a historical health data table having a historical blade data. The health monitoring processor may be configured to compare the blade displacement data against the historical blade data to determine a blade health. In various embodiments, the excitation control signal may comprise at least one of a force location, a force frequency, or a force pattern. The force pattern may comprise a temporal sinusoidal pattern, a chirp pattern, or a square wave pattern. The force frequency may be based on at least one of a frequency of the fan blade or a nodal diameter pattern of the fan blade. In various embodiments, the force may be configured to excite the fan blade through resonance of a non-integral vibratory mode, and wherein the health monitoring sensor is configured to characterize a blade vibratory characteristic of the fan blade. In various embodiments, the health monitoring sensor may comprise at least one of a non-contacting structural measurement system (NSMS), an eddy current probe, an optical probe, or a capacitance probe.

In various embodiments, a method for blade health monitoring is disclosed. The method may comprise transmitting, by a health monitoring processor in electronic communication with an excitation actuator, an excitation control signal; pulsing, by the excitation actuator, a force based on the excitation control signal, wherein the force is configured to excite a vibratory response in a fan blade; measuring, by a health monitoring sensor in electronic communication with the health monitoring processor, the vibratory response of the fan blade; and transmitting, by the health monitoring sensor, a blade displacement data based on the measured vibratory response.

In various embodiments, the method may further comprise retrieving, by the health monitoring processor, a historical blade data from a historical health data table. The method may also comprise comparing, by the health monitoring processor, the blade displacement data against the historical blade data to determine a blade health. In various embodiments, the excitation control signal may comprise at least one of a force location, a force frequency, or a force pattern. The force pattern may comprise a temporal sinusoidal pattern, a chirp pattern, or a square wave pattern. The force frequency may be based on at least one of a frequency of the fan blade or a nodal diameter pattern of the fan blade. In various embodiments, the force may be configured to excite the fan blade through resonance of a non-integral vibratory mode, and wherein the health monitoring sensor is configured to characterize a blade vibratory characteristic of the fan blade. In various embodiments, the health monitoring sensor may comprise at least one of a non-contacting structural measurement system (NSMS), an eddy current probe, an optical probe, or a capacitance probe.

In various embodiments, an article of manufacture is disclosed. The article of manufacture may include a tangible, non-transitory computer-readable storage medium having instructions stored thereon that, in response to execution by a processor, cause the processor to perform operations. The operations may comprise transmitting, by the processor in electronic communication with an excitation actuator, an excitation control signal; pulsing, by the excitation actuator, a force based on the excitation control signal, wherein the force is configured to excite a vibratory response in a fan blade; measuring, by a health monitoring sensor in electronic communication with the processor, the vibratory response of the fan blade; and transmitting, by the health monitoring sensor, a blade displacement data based on the measured vibratory response.

In various embodiments, the operations may further comprise retrieving, by the processor, a historical blade data from a historical health data table. The operations may further comprise comparing, by the processor, the blade displacement data against the historical blade data to determine a blade health. In various embodiments, the excitation control signal may comprise at least one of a force location, a force frequency, or a force pattern. In various embodiments, the force may be configured to excite the fan blade through resonance of a non-integral vibratory mode, and wherein the health monitoring sensor is configured to characterize a blade vibratory characteristic of the fan blade. In various embodiments, the health monitoring sensor may comprise at least one of a non-contacting structural measurement system (NSMS), an eddy current probe, an optical probe, or a capacitance probe.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

Figure 1A:
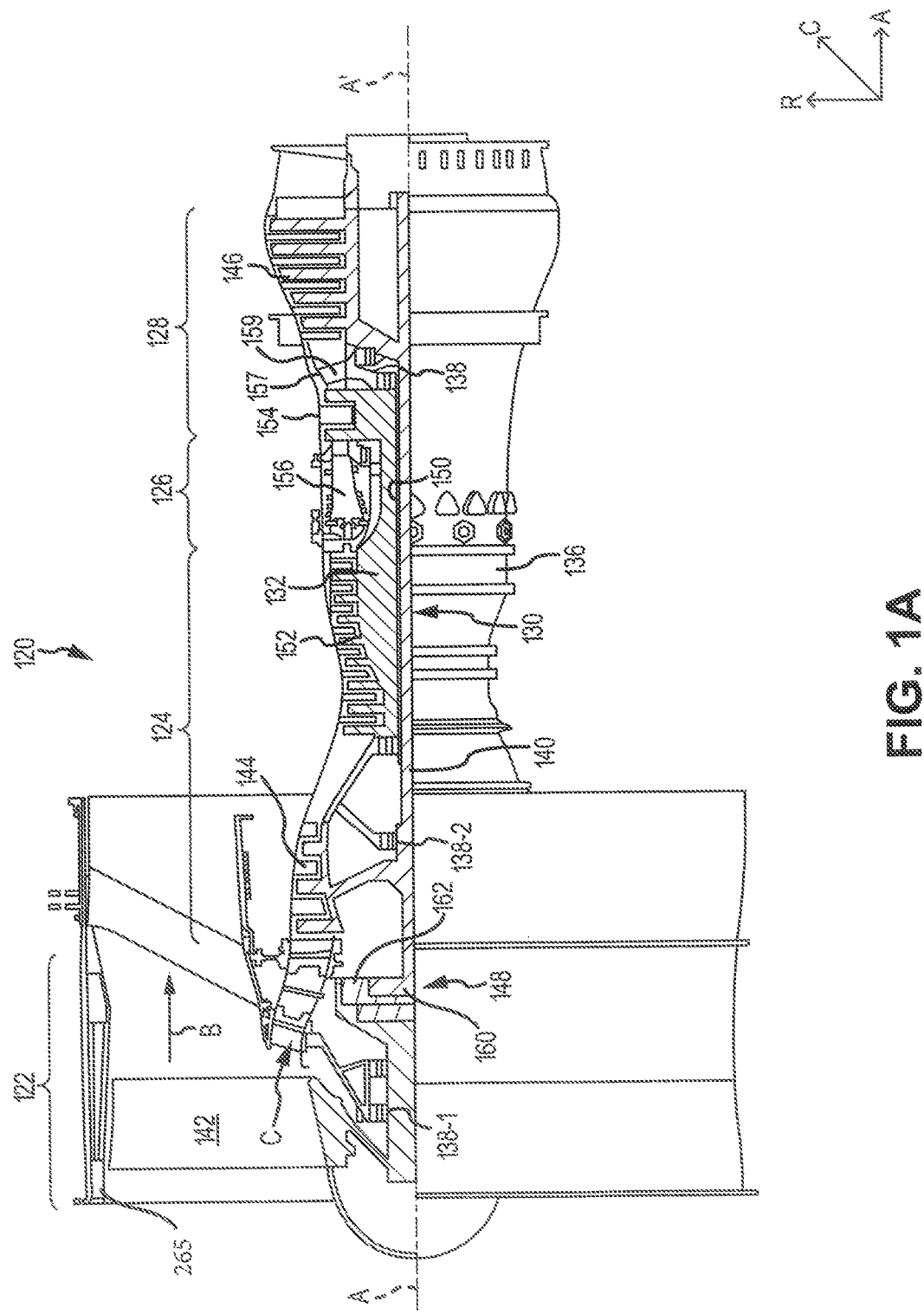
FIG. 1A illustrates a cross-section view of a gas turbine engine, in accordance with various embodiments.

In various embodiments, and with reference to FIG. 1A, a gas turbine engine 120 is disclosed. As used herein, "aft" refers to the direction associated with a tail (e.g., the back end) of an aircraft, or generally, to the direction of exhaust of gas turbine engine 120. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1A provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128.

Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

In various embodiments, gas turbine engine 120 may comprise a high-bypass ratio geared aircraft engine. The bypass ratio of gas turbine engine 120 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 152 than are conventionally experienced. These higher operating temperatures and pressure ratios create operating environments that cause thermal loads that are higher than the thermal loads conventionally experienced, which may shorten the operational life of current components.

Figure 1B:
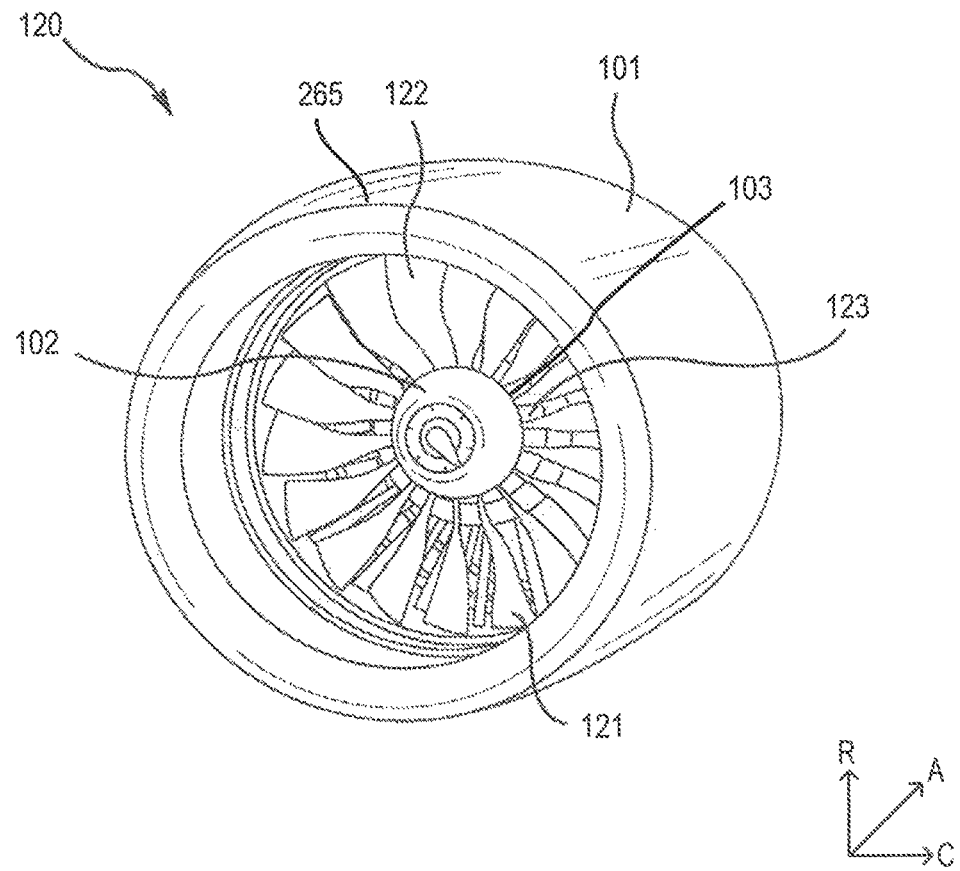
FIG. 1B illustrates a perspective view of a front portion of a gas turbine engine, in accordance with various embodiments.

In various embodiments, and with reference to FIG. 1B, a perspective view of a front portion of gas turbine engine 120 is depicted in greater detail. Gas turbine engine 120 may comprise a nacelle 101, fan section 122, and nose cone 102. Fan section 122 may comprise a plurality of circumferentially arranged fan blades 121. Fan platforms 123, or spacers, may be arranged between adjacent fan blades 121. Fan blades 121 may be mounted to a fan hub 103 located radially inward of fan platforms 123. Nose cone 102 may be arranged forward of fan blades 121 to provide an aerodynamic flow path through fan section 122 along with fan platforms 123.

Figure 2:
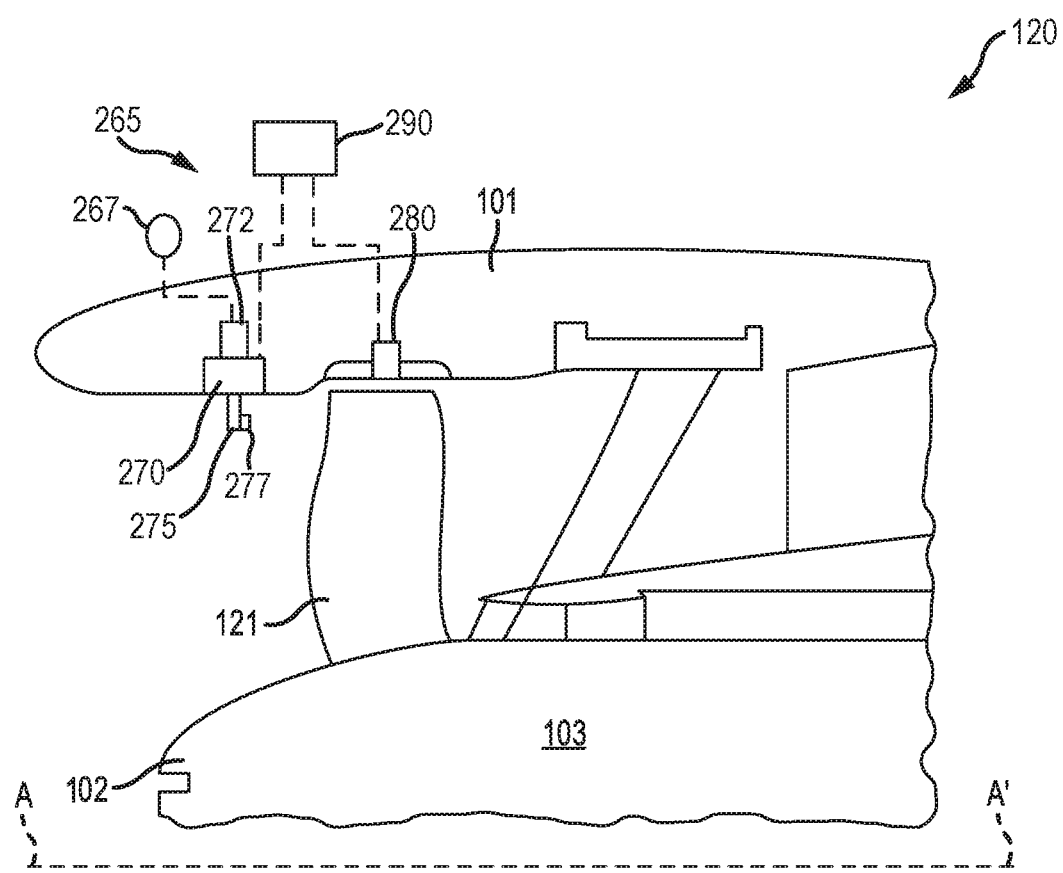
FIG. 2 illustrates a blade health monitoring system for a gas turbine engine, in accordance with various embodiments.

In various embodiments, and with reference to FIG. 2, a blade health monitoring system 265 is disclosed. Blade health monitoring system 265 may be configured to monitor and assess the health of blades within gas turbine engine 120. For example, blade health monitoring system 265 may be used to detect cracks, erosion, wear, foreign object damage ("FOD"), and/or any other such damages and/or instabilities in a blade. The present disclosure may improve health diagnostic capabilities for engine blades, thus reducing the risk of blade failure during gas turbine engine 120 operation, increasing the useful life of each engine blade, and allowing for more accurate maintenance and/or inspection schedules of engine blades. Although the present disclosure may make reference to blade health monitoring of fan blades, it should be understood by one skilled in the art that the present disclosure extends to health monitoring of other blades within gas turbine engine 120, and/or any other suitable engine, such as, for example, rotor blades.

In various embodiments, blade health monitoring system 265 may comprise various components to aid in blade health monitoring and diagnosing. For example, blade health monitoring system 265 may comprise an excitation actuator 270, a health monitoring sensor 280, and/or a health monitoring processor 290. Blade health monitoring system 265 may be installed within nacelle 101 of gas turbine engine 120, as discussed further herein. In that respect, blade health monitoring system 265 may be coupled to nacelle 101 and may allow for blade health monitoring during operation of gas turbine engine 120. In various embodiments, blade health monitoring system 265 may also be removably inserted within nacelle 101, and may allow for blade health monitoring during diagnosis, maintenance, and/or scheduled inspections of gas turbine engine 120.

In various embodiments, blade health monitoring system 265 may comprise a health monitoring processor 290. Health monitoring processor 290 may be in electronic communication with excitation actuator 270 and/or health monitoring sensor 280. In various embodiments, health monitoring processor 290 may be integrated into computer systems onboard an aircraft, such as, for example, a full authority digital engine control (FADEC), an engine-indicating and crew-alerting system (EICAS), and/or the like. In various embodiments, health monitoring processor 290 may also be a standalone computer system separate from and off-board the aircraft, such as, for example, in a diagnostic and/or maintenance computer system. Health monitoring processor 290 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, health monitoring processor 290 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, health monitoring processor 290 may be configured to control blade health monitoring system 265. For example, health monitoring processor 290 may be configured to transmit an excitation control signal to excitation actuator 270. Health monitoring processor 290 may generate and transmit the excitation control signal based on a user's input (e.g., input by a technician, maintenance personnel, etc.). The excitation control signal may comprise electronic instructions configured to cause excitation actuator 270 to pulse and/or create a force (e.g., an airflow, a fluid flow, a gas flow, an electromagnetic force, etc.) at one or more specific locations (e.g., a force location), frequencies (e.g., a force frequency), and/or patterns (e.g., a force pattern), as discussed further herein. The force may excite fan blades 121 to drive a vibratory response in the corresponding fan blade 121.

In various embodiments, blade health monitoring system 265 may comprise one or more excitation actuator 270. Excitation actuator 270 may be in electronic communication with health monitoring processor 290. Excitation actuator 270 may comprise any suitable apparatus capable of pulsing and/or creating a force (e.g., an air flow, a fluid flow, a gas flow, an electromagnetic force, etc.) towards fan blades 121. For example, excitation actuator 270 may comprise a bleed valve, an air excitation actuator, a water jet, an electromagnetic actuator, and/or any other suitable apparatus capable of pulsing and/or creating a force. Excitation actuator 270 may be located in any suitable position in gas turbine engine 120 capable of pulsing and/or creating a force towards fan blades 121. For example, excitation actuator 270 may be located in and/or coupled to nacelle 101, in a forward position from fan blades 121. In that respect, excitation actuator 270 may be located within nacelle 101 and coupled to a radially inner surface of nacelle 101. In various embodiments, excitation actuator 270 may be inserted within a borescope port. For example, excitation actuator 270 may be coupled to a radially outer surface of nacelle 101 and an actuator passage 275 may be inserted through the borescope port and out the radially inner surface of nacelle 101.

In various embodiments, excitation actuator 270 may comprise a high frequency valve 272, an actuator passage 275, a force outlet 277, and/or any other suitable and/or desired components. High frequency valve 272 may be configured to supply air, gas, fluid, and/or the like to excitation actuator 270. For example, and in various embodiments, high frequency valve 272 may be in fluid communication with an air supply 267. Air supply 267 may comprise any suitable air supply, air tank, fluid tank, and/or the like having a pressurized air, gas, and/or fluid (e.g., water). In various embodiments, high frequency valve 272 may be configured to intake air, gas, and/or fluid without an air supply 267. For example, high frequency valve 272 may comprise an intake fan and/or the like configured to drive and/or pressurize air and/or gas into excitation actuator 270. High frequency valve 272 may be configured to actuate open to supply air, gas, and/or fluid to excitation actuator 270 in response to excitation actuator 270 receiving the excitation control signal. The excitation control signal may cause high frequency valve 272 to continually supply a force (e.g., an air flow, fluid flow, etc.), to supply the force in time intervals (e.g., every 5 seconds, etc.), and/or the like. In that respect, high frequency valve 272 may be configured to quickly open and close such that the supplied force may be accurately controlled.

In response to high frequency valve 272 opening to supply air, gas, and/or fluid, excitation actuator 270 may pressurize and transmit the supplied air, gas, and/or fluid through actuator passage 275 and out force outlet 277 (or air nozzle). Excitation actuator 270 may pulse the force to cause a non-integral vibratory excitation (e.g., flutter) in each fan blade 121 (e.g., to excite a non-integral vibratory response in fan blade 121). For example, excitation actuator 270 may create and/or pulse the force to excite fan blade 121 through resonance of a non-integral vibratory mode. Non-integral vibratory excitations may be easier to observe and measure by health monitoring sensor 280, as discussed further herein.

In various embodiments, the excitation control signal may comprise electronic instructions configured to cause excitation actuator 270 to pulse the force at one or more locations (e.g., a force location), frequencies (e.g., a force frequency), and/or patterns (e.g., a force pattern). For example, excitation actuator 270 may be configured to pulse a force at varying frequencies (e.g., 30 Hz, 50, Hz, 100 Hz, etc.). The specified frequency to pulse and/or create the force may be based on the frequency of the rotating fan blades 121, the nodal diameter patterns of the rotating fan blades 121, and/or other such engine operational factors and vibratory characteristics. As a further example, excitation actuator 270 may be configured to pulse and/or create the force to comprise a temporal sinusoidal pattern, a chirp pattern, a square wave pattern, and/or any other suitable and/or desired pattern.

In various embodiments, blade health monitoring system 265 may comprise one or more health monitoring sensor 280. Health monitoring sensor 280 may be in electronic communication with health monitoring processor 290. Health monitoring sensor 280 may be configured to measure and/or characterize blade vibratory characteristics from fan blades 121. In the respect, health monitoring sensor 280 may be located in any suitable location in close proximity to fan blades 121. For example, health monitoring sensor 280 may be located in nacelle 101 and may be coupled to a radially inner surface of nacelle 101, radially outward from fan blades 121. Health monitoring sensor 280 may comprise any type of sensor capable of measuring and/or characterizing blade vibratory characteristics, such as, for example, a non-contacting structural measurement system (NSMS), an eddy current probe, an optical probe, a capacitance probe, and/or the like.

In various embodiments, health monitoring sensor 280 may be configured to measure and/or characterize blade vibratory characteristics from fan blades 121 and generate a blade displacement data. For example, health monitoring sensor 280 may be configured to measure and/or characterize a resonant response, frequency, damping, and/or any other suitable vibratory characteristics of each fan blade 121. The blade displacement data may comprise the measured and/or characterized blade vibratory characteristics for each fan blade 121. For example, the blade displacement data may include measured frequency values each fan blade 121 (e.g., in response to the force exciting each fan blade 121, each fan blade 121 may vibrate at a measurable frequency). For example, the blade displacement data may include that a first fan blade had a measured frequency of 122 Hz, a second fan blade had a measured frequency of 122 Hz, a third fan blade 3 had a measured frequency of 120 Hz, etc. Health monitoring sensor 280 may transmit the blade displacement data to health monitoring processor 290.

In various embodiments, health monitoring processor 290 may be configured to receive the blade displacement data from health monitoring sensor 280. Health monitoring processor 290 may be configured to parse and analyze the blade displacement data to diagnose and determine the health of fan blades 121. In that respect, health monitoring processor 290 may comprise a historical health data table. The historical health data table may comprise any suitable data structure, such as a database (including a relational, hierarchical, graphical, blockchain, or object-oriented structure and/or any other database configurations), a flat file structure, and/or the like. The historical health data table may contain a historical blade data. The historical blade data may comprise data indicative of a historically measured frequency, damping, and/or other vibratory characteristics for engine blades (e.g., fan blades, rotor blades, etc.) over the lifetime of the blade. The historical blade data may comprise data indicating vibratory characteristic for engine blades that are new, 5 years old, 10 years old, and/or during any other suitable and/or desired time interval. For example, the historical blade data may comprise data that an engine blade after 10 years of use has a frequency of 122 Hz.

In various embodiments, health monitoring processor 290 may diagnosis the blade health by comparing the blade displacement data to the historical blade data. For example, in response to the blade displacement data indicating that a fan blade 121 having 10 years of use has a frequency of 122 Hz, and the historical blade data for a fan blade at 10 years of use has a frequency of 122 Hz, health monitoring processor 290 may determine that the fan blade 121 is "healthy" (e.g., does not need maintenance). As a further example, in response to the blade displacement data indicating that a fan blade 121 having 10 years of use has a frequency of 120 Hz, and the historical blade data for a fan blade at 10 years of use has a frequency of 122 Hz, health monitoring processor 290 may determine that the fan blade 121 may need maintenance and/or service soon. As a further example, in response to the blade displacement data indicating that a fan blade 121 having 10 years of use has a frequency of 110 Hz, and the historical blade data for a fan blade at 10 years of use has a frequency of 122 Hz, health monitoring processor 290 may determine that the fan blade 121 is requires immediate maintenance and/or service. In that respect, the blade health may indicate whether a fan blade 121 has been damaged during operation. The blade health may also indicate a percent of damage (e.g., a blade health percent) for each fan blade (e.g., 90%, 80%, 70%, etc.).

Figure 3:
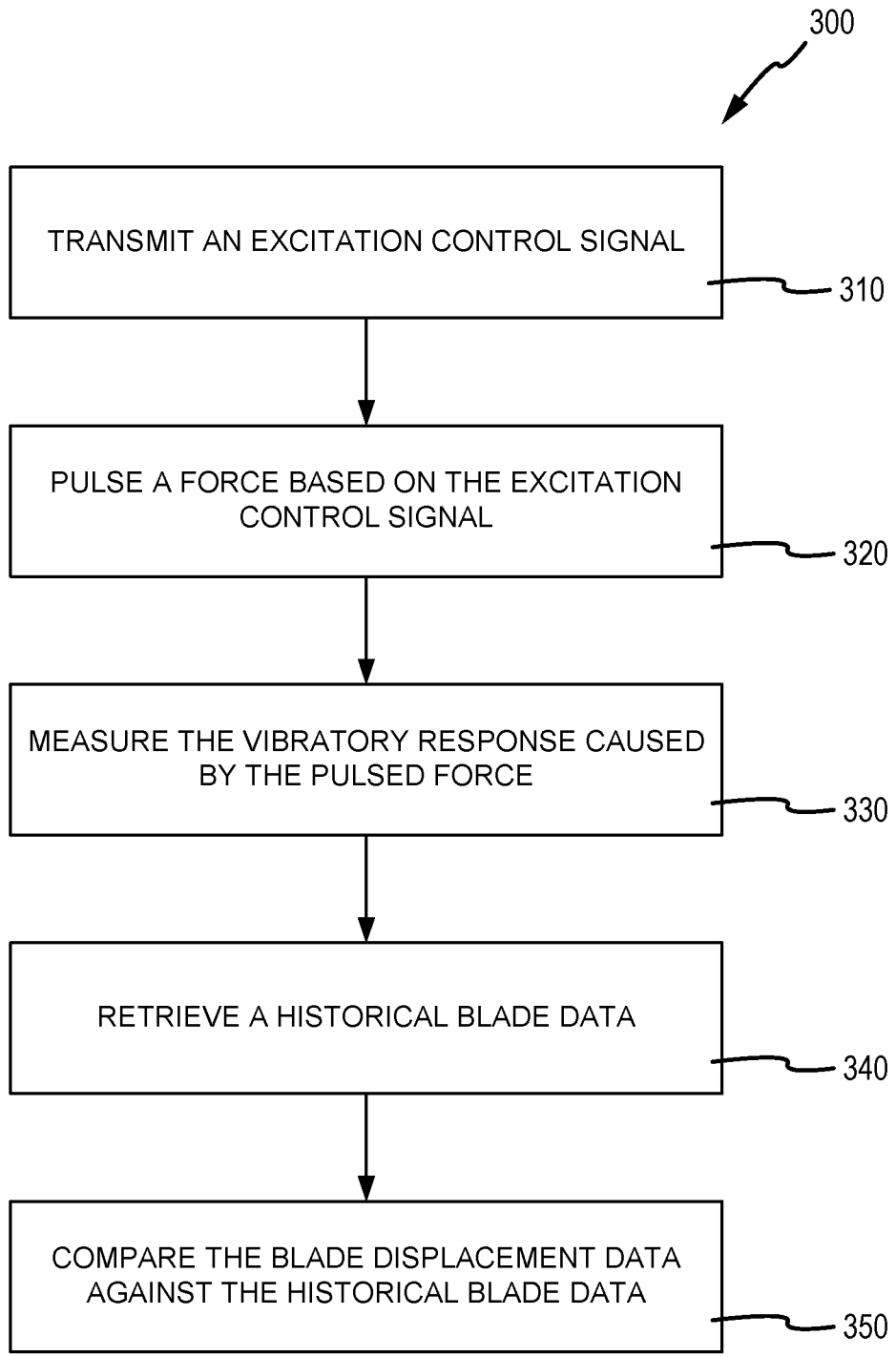
FIG. 3 illustrates a process flow for a method of blade health monitoring, in accordance with various embodiments.

In various embodiments, and with reference to FIGS. 3 and 2, a method 300 for blade health monitoring is disclosed. As previously discussed, method 300 may be used to detect cracks, erosion, wear, foreign object damage ("FOD"), and/or any other such damages and/or instabilities in a blade. Method 300 may improve health diagnostic capabilities for engine blades, thus reducing the risk of blade failure during engine operation, increasing the useful life of each engine blade, and allowing for more accurate maintenance and/or inspection schedules of engine blades.

In various embodiments, method 300 may comprise transmitting an excitation control signal (Step 310). Health monitoring processor 290 may be configured to generate and transmit the excitation control signal. Health monitoring processor 290 may transmit the excitation control signal to excitation actuator 270. The excitation control signal may comprise electronic instructions configured to cause excitation actuator 270 to pulse and/or create a force at one or more locations, frequencies, and/or patterns.

In various embodiments, method 300 may comprise pulsing a force based on the excitation control signal (Step 320). Excitation actuator 270 may receive the excitation control signal from health monitoring processor 290. In response to receiving the excitation control signal, excitation actuator 270 may receive air, gas, fluid, and/or the like, via high frequency valve 272, and pulse and/or create the force, via actuator passage 275 and force outlet 277. Excitation actuator 270 may pulse and/or create the force to excite fan blades 121, causing a non-integral vibratory excitation in each individual fan blade 121. Excitation actuator 270 may also pulse and/or create the force to excite fan blade 121 through resonance of a non-integral vibratory mode. Excitation actuator 270 may pulse the force at one or more fan blade 121 locations, frequencies, and/or patterns, based on the excitation control signal.

In various embodiments, method 300 may comprise measuring the vibratory response caused by the pulsed force (Step 330). Health monitoring sensor 280 may measure the vibratory response caused by the pulsed force. For example, health monitoring sensor 280 may measure and/or characterize the blade vibratory characteristics from fan blades 121, such as, for example, a resonant response, frequency, damping, and/or any other suitable vibratory characteristics. As a further example, the blade vibratory characteristics may also include data indicating a blade position, a blade velocity, a blade acceleration, and/or any other similar time-derivative of displacement data. Health monitoring sensor 280 may transmit a blade displacement data comprising the blade vibratory characteristics of each individual fan blade 121. Health monitoring sensor 280 may transmit the blade displacement data to health monitoring processor 290.

In various embodiments, method 300 may comprise retrieving a historical blade data (Step 340). Health monitoring processor 290 may comprise a historical health data table having historical blade data. In various embodiments, method 300 may comprise comparing the blade displacement data against the historical blade data. (Step 350). Health monitoring processor 290 may compare the blade displacement data against the historical blade data retrieved from the historical health data table. The comparison of the blade displacement data against the historical blade data may determine a blade health of each individual fan blade 121. In that respect, the blade health may indicate whether a fan blade 121 has been damaged during operation. The blade health may also indicate a percent of damage (e.g., a blade health percent) for each fan blade (e.g., 90%, 80%, 70%, etc.).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for blade health monitoring of a gas turbine engine, comprising:
   a nacelle;
   a health monitoring processor configured to transmit an excitation control signal during operation of the gas turbine engine;
   an excitation actuator coupled to the nacelle in a forward position from a plurality of fan blades, the excitation actuator comprising a force outlet, an actuator passage, and a high frequency valve, the force outlet aligned in an axial direction configured to receive the excitation control signal and create a force comprising a chirp pattern in the axial direction based on the excitation control signal, the high frequency valve configured to open and close to pulse the force at varying frequencies in response to the excitation control signal, wherein the force is configured to excite a vibratory response in the plurality of fan blades, each fan blade in the plurality of fan blades having a tip;
   a health monitoring sensor disposed proximate the tip of a fan blade of the plurality of fan blades and in communication with the health monitoring processor wherein:
      the force is configured to excite the fan blade through resonance of a non-integral vibratory mode,
      the health monitoring sensor is configured to measure the vibratory response of the fan blade, characterize a blade vibratory characteristic of the fan blade, and generate a blade displacement data based on the measured vibratory response and the characterized blade vibratory characteristic, and
      the health monitoring processor is configured to diagnose a blade health by comparing the blade displacement data to a historical blade data for another fan blade at a similar amount of use to the monitored fan blade.

2. The system of claim 1, wherein the health monitoring processor comprises a historical health data table having the historical blade data and wherein the blade health is measured as a percent of damage for the fan blade.

3. The system of claim 1, wherein the force is configured to excite the fan blade through resonance of a non-integral vibratory mode, and wherein the health monitoring sensor is configured to characterize a blade vibratory characteristic of the fan blade.

4. The system of claim 1, wherein the excitation control signal comprises at least one of a force location, a force frequency, or a force pattern.

5. The system of claim 4, wherein the force frequency is based on at least one of a frequency of the fan blade or a nodal diameter pattern of the fan blade.

6. The system of claim 1, wherein the health monitoring sensor comprises at least one of a non-contacting structural measurement system (NSMS), an eddy current probe, an optical probe, or a capacitance probe.

7. A method for blade health monitoring of a gas turbine engine, comprising:
   transmitting, by a health monitoring processor in communication with an excitation actuator during operation of the gas turbine engine, an excitation control signal, the excitation actuator coupled to a nacelle of the gas turbine engine in a forward position from a fan blade;
   pulsing, by the excitation actuator comprising a force outlet aligned in an axial direction, an actuator passage, and a high frequency valve, a force comprising a chirp pattern in the axial direction by opening and closing the high frequency valve at varying frequencies based on the excitation control signal, wherein the force is configured to excite a vibratory response in the fan blade, wherein the force is configured to excite the fan blade through resonance of a non-integral vibratory mode;
   measuring, by a health monitoring sensor disposed proximate to a tip of the fan blade and in communication with the health monitoring processor, the vibratory response of the fan blade;
   characterizing, by the health monitoring sensor, a blade vibratory characteristic of the fan blade;
   transmitting, by the health monitoring sensor to the health monitoring processor, a blade displacement data based on the measured vibratory response and the characterized blade vibratory characteristic;
   comparing, by the health monitoring processor, the blade displacement data to a historical blade data for another fan blade at a similar amount of use to the monitored fan blade; and
   diagnosing, by the health monitoring processor, a health of the monitored fan blade.

8. The method of claim 7, further comprising retrieving, by the health monitoring processor, the historical blade data from a historical health data table.

9. The method of claim 8, wherein the blade health is measured as a percent of damage for the fan blade.

10. The method of claim 7, wherein the excitation control signal comprises at least one of a force location, a force frequency, or a force pattern.

11. The method of claim 7, wherein the health monitoring sensor comprises at least one of a non-contacting structural measurement system (NSMS), an eddy current probe, an optical probe, or a capacitance probe.

12. An article of manufacture including a tangible, non-transitory computer-readable storage medium having instructions stored thereon that, in response to execution by a processor during operation of a gas turbine engine, cause the processor to perform operations comprising:
   transmitting, by the processor in communication with an excitation actuator, an excitation control signal, the excitation actuator coupled to a nacelle of the gas turbine engine in a forward position from a fan blade;
   pulsing, by the excitation actuator comprising a force outlet aligned in an axial direction, an actuator passage, and a high frequency valve, a force comprising a chirp pattern in the axial direction by opening and closing the high frequency valve at varying frequencies based on the excitation control signal, wherein the force is configured to excite a vibratory response in the fan blade, wherein the force is configured to excite the fan blade through resonance of a non-integral vibratory mode;

measuring, by a health monitoring sensor disposed proximate to a tip of the fan blade and in communication with the processor, the vibratory response of the fan blade;

characterizing, by the health monitoring sensor, a blade vibratory characteristic of the fan blade;

transmitting, by the health monitoring sensor to the health monitoring processor, a blade displacement data based on the measured vibratory response and the characterized blade vibratory characteristic;

comparing, by the processor, the blade displacement data to a historical blade data for another fan blade at a similar amount of use to the monitored fan blade; and diagnosing, by the processor, a health of the monitored fan blade.

13. The article of manufacture of claim 12, wherein the operations further comprise determining, by the processor, a percent of damage for the fan blade.

14. The article of manufacture of claim 12, wherein the health monitoring sensor comprises at least one of a non-contacting structural measurement system (NSMS), an eddy current probe, an optical probe, or a capacitance probe.

15. The article of manufacture of claim 12, wherein the operations further comprise retrieving, by the processor, the historical blade data from a historical health data table.

* * * * *